United States Patent [19]
Brossier et al.

[11] Patent Number: 5,470,020
[45] Date of Patent: Nov. 28, 1995

[54] COMBINATION TURBOJET ENGINE NOZZLE AND THRUST REVERSER

[75] Inventors: Pascal N. Brossier, Lieusaint; Jean-Marie N. Pincemin, Crosne; Pascal Wurniesky, Savigny le Tempe, all of France

[73] Assignee: Societe Nationale d'Etude et de Construction de Moteurs d'Aviation (S.N.E.C.M.A.), Paris, France

[21] Appl. No.: 319,043

[22] Filed: Oct. 6, 1994

[30] Foreign Application Priority Data

Oct. 6, 1993 [FR] France ..................... 93 11898

[51] Int. Cl.$^6$ ................................. B64C 15/00
[52] U.S. Cl. ..................... 239/265.33; 239/265.39; 244/12.5
[58] Field of Search ............... 239/265.11, 254.19, 239/265.25–265.29, 265.33–265.39; 244/12.5, 23 D, 52, 110, 13; 60/230, 232, 262, 271

[56] References Cited

U.S. PATENT DOCUMENTS

| | | | |
|---|---|---|---|
| 3,240,442 | 1/1969 | Teagle | 242/542.4 |
| 3,601,349 | 8/1971 | Hillbig | 410/104 |
| 3,610,533 | 10/1971 | Johnson | 239/265.19 |
| 3,690,561 | 9/1972 | Potter | 239/265.37 X |
| 3,856,239 | 12/1974 | Leibach | 239/265.19 X |
| 4,817,871 | 4/1989 | Berneuil et al. | 239/265.39 |
| 4,865,256 | 9/1989 | Durend et al. | 239/265.29 |

FOREIGN PATENT DOCUMENTS

| | | |
|---|---|---|
| 1225736 | 7/1960 | France . |
| 2096538 | 2/1972 | France . |
| 2602274 | 2/1988 | France . |
| 2617910 | 1/1989 | France . |

Primary Examiner—Andres Kashnikow
Assistant Examiner—Lesley D. Morris
Attorney, Agent, or Firm—Bacon & Thomas

[57] ABSTRACT

A combination converging-diverging exhaust nozzle and thrust reverser for an aircraft turbojet engine is disclosed having a generally annular array of cold flaps extending from a downstream end of a cowling support structure and a generally annular, inner array of hot flaps, located radially inwardly of the cold flap array and extending downstream from an end of the hot gas exhaust duct. The annular array of hot gas flaps comprises two sets of hot flap arrays, an array of first hot flaps being pivotally attached to the downstream edge of the hot gas exhaust duct with the array of second hot flaps having upstream edges that are in contact with downstream edges of the array of first hot flaps. The positions of the arrays of the first and second hot flaps may be adjusted relative to a central longitudinal axis to form a converging-diverging nozzle with a variable cross-sectional area. The array of second hot flaps is also movable between a forward thrust position, wherein the upstream edges of the second hot flaps are urged into contact with the downstream edges of the first hot flaps and a reverse thrust position wherein the upstream edges of the second hot flaps are displaced away from the downstream edges of the first hot flaps. In the reverse thrust position, the downstream edges of the second hot flaps are in contact with each other so as to effectively block the exhaust gases and to redirect them in a direction which will induce a reverse thrust force onto the engine structure.

10 Claims, 5 Drawing Sheets

COMBINATION TURBOJET ENGINE NOZZLE AND THRUST REVERSER

BACKGROUND OF THE INVENTION

The present invention relates to a combination converging-diverging turbojet engine nozzle and thrust reverser.

Turbojet engine aircraft must often carry out their assigned missions in subsonic or supersonic operating conditions. For such purposes, the turbojet engines may be equipped with an afterburning system and a variable cross-section nozzle which may alter its shape in a convergent-divergent manner suitable for subsonic or supersonic gas flow. The minimum nozzle cross-sectional area is adjustable in relation to the engine operational mode by reducing the cross-sectional area of the nozzle throat under normal operations and enlarging the cross-sectional area when using the afterburner.

Typical examples of such exhaust nozzle structure may be found in French Patents 1,225,736; 2,602,274 and 2,617,910. The nozzles according to these known systems, however, do not include a thrust reverser.

SUMMARY OF THE INVENTION

A combination converging-diverging exhaust nozzle and thrust reverser for an aircraft turbojet engine is disclosed having a generally annular array of cold flaps extending from a downstream end of a cowling support structure and a generally annular, inner array of hot flaps, located radially inwardly of the cold flap array and extending downstream from an end of the hot gas exhaust duct. The annular array of hot gas flaps comprises two sets of hot flap arrays, an array of first hot flaps being pivotally attached to the downstream edge of the hot gas exhaust duct with the array of second hot flaps having upstream edges that are in contact with downstream edges of the array of first hot flaps. The positions of the arrays of the first and second hot flaps may be adjusted relative to a central longitudinal axis to form a converging-diverging nozzle with a variable cross-sectional area.

The array of second hot flaps is also movable between a forward thrust position, wherein the upstream edges of the second hot flaps are urged into contact with the downstream edges of the first hot flaps and a reverse thrust position wherein the upstream edges of the second hot flaps are displaced away from the downstream edges of the first hot flaps. In the reverse thrust position, the downstream edges of the second hot flaps are in contact with each other so as to effectively block the exhaust gases and to redirect them in a direction which will induce a reverse thrust force onto the engine structure.

In order to redirect the hot exhaust gases in a reverse thrusting direction, it is necessary to move the array of cold flaps away from the cowling supporting structure so as to provide openings for the reverse thrust exhaust gases. This may be achieved by pivoting the array of cold flaps as the array of second hot flaps move to their reverse thrust positions. Such pivoting of the array of cold flaps causes the upstream edges of these flaps to be displaced away from the downstream edge of the cowling support structure. The cold flaps may be attached to a pivoting member which also actuates the movement of the second hot flaps between their forward thrust and reverse thrust positions such that it moves both the second hot flaps and the cold flaps to their reverse thrust positions. Alternatively, the array of cold flaps may be attached to an annular member which is slidably mounted on the cowling support structure. By sliding the annular member relative to the cowling support structure, in either the upstream or downstream direction, the array of cold flaps are moved to positions in which they remain out of contact with the hot exhaust gases.

The combination also includes a biasing system for urging the upstream ends of the second hot flaps into contact with the downstream edges of the first hot flaps when the array of second hot flaps is in the forward thrust position.

DETAILED DESCRIPTION OF THE PREFERRED EMBODIMENTS

Figure 1:
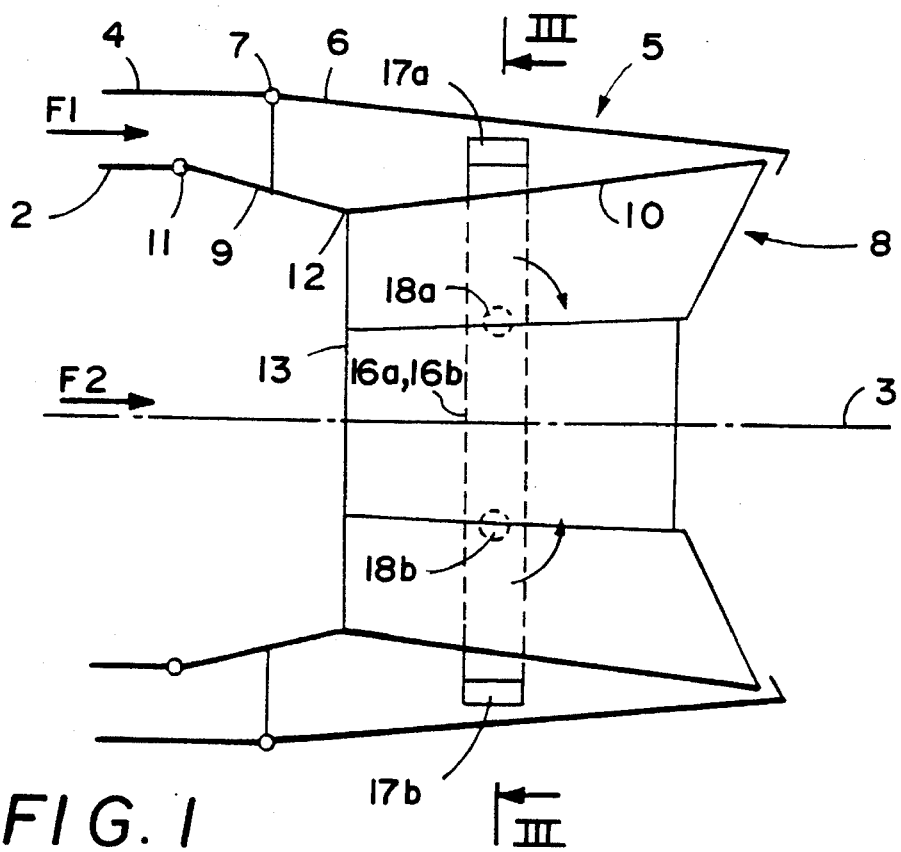
FIG. 1 is a partial, schematic cross-sectional view of the combination converging-diverging exhaust nozzle and thrust reverser according to the invention with the elements in their forward thrust positions and the cross-sectional area of the nozzle at a minimum.

Reference numeral 2 denotes the stationary downstream end of a turbojet engine hot gas exhaust duct which is generally annular in configuration and extends about central axis 3, while numeral 4 denotes the cowling support structure which is generally co-axial with the hot gas exhaust duct 2 and which is radially spaced outwardly from the hot gas exhaust duct. The space between the hot gas exhaust duct and the cowling support structure accommodates a flow F1 of cold air while flow F2 denotes the flow of hot gases in an upstream to downstream direction issuing from the turbine or the afterburning chamber of the turbojet engine.

A converging-diverging exhaust nozzle 5 is mounted downstream of the downstream edges of the hot gas exhaust duct 2 and cowling support structure 4, and comprises an external array of cold flaps 6 and an inner array of hot flaps 8 which is comprised of an array of first hot flaps 9 and an array of second hot flaps 10 mounted in extension of each other.

Figure 2:
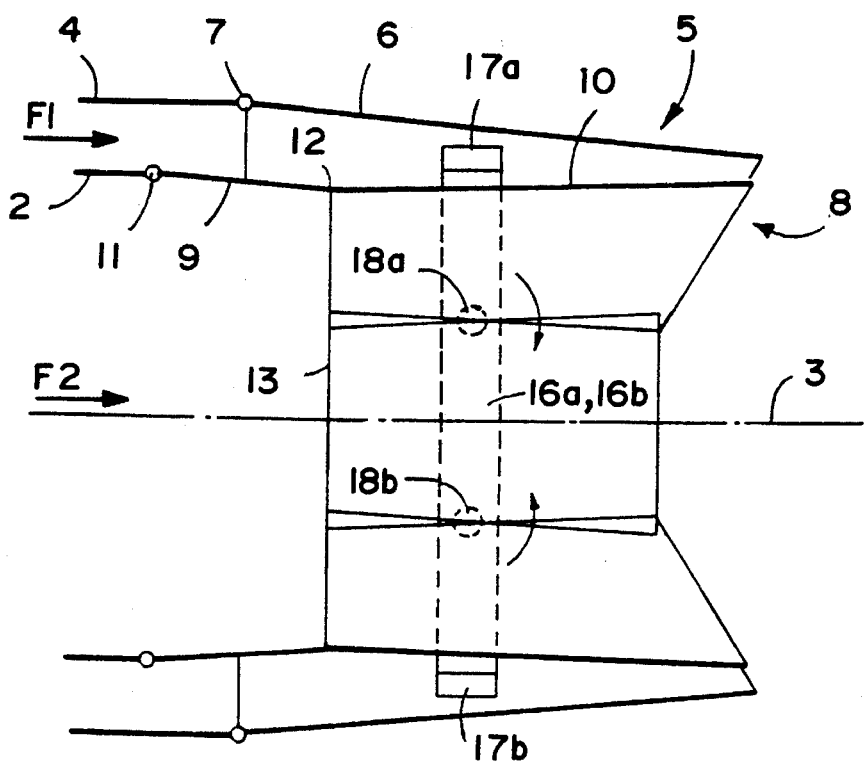
FIG. 2 is a view similar to FIG. 1 with the hot flaps positioned such that the cross-sectional area of the throat of the converging-diverging nozzle is at a maximum.

The array of first hot flaps 9 is pivotally attached by upstream edges 11 to the downstream edge of the hot gas exhaust duct 2. This upstream or array of first hot flaps constitutes an assembly of converging flaps which may be pivoted about their connection to the hot gas exhaust duct. An array of second hot flaps 10 comprises the diverging-portion of the nozzle and has an upstream edge 12 which is in contact with the downstream edges of the array of first hot flaps 9 so as to define the throat 13 of the converging-diverging exhaust nozzle. As is well-known in the art, the converging-diverging exhaust nozzle structure may incorporate an actuating mechanism which enables the cross-sectional area of the throat 13 to be varied between a minimum, illustrated in FIG. 1, and a maximum, illustrated in FIG. 2. The actuating mechanisms for moving the array of hot flaps are well-known in the art and are omitted from the drawings. The actuators and associated circuits are mounted in the annular space between the annular array of cold flaps 6 and the array of hot flaps 8 in which the cold flow air stream F1 moves.

Figure 3:
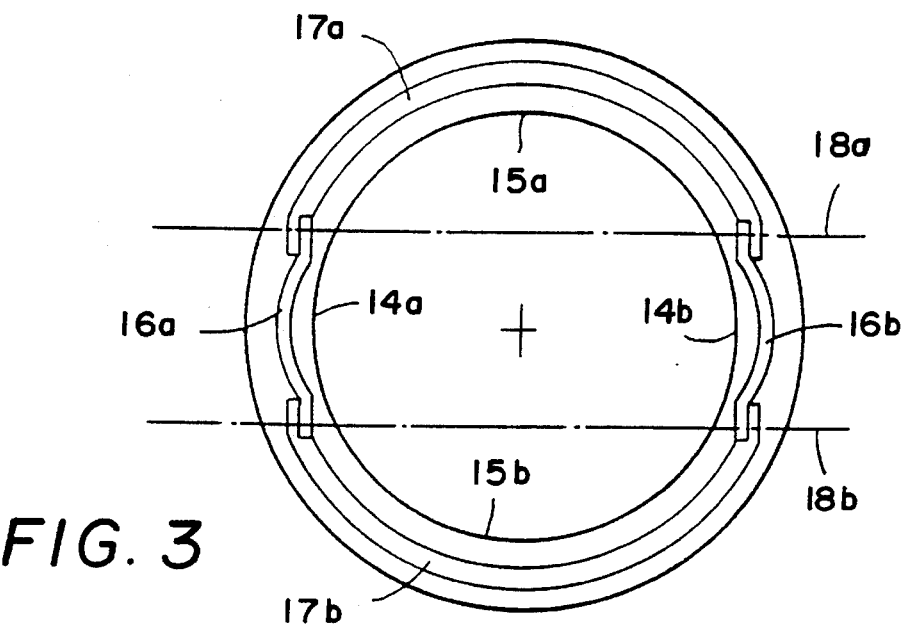
FIG. 3 is a cross-sectional view taken along line III—III in FIG. 1.
Figure 4:
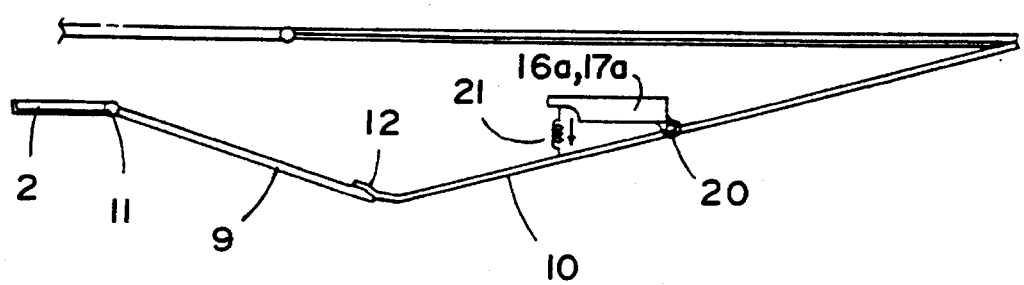
FIG. 4 is a partial schematic cross-sectional view illustrating the attachment of the flaps to the support structure.

In the present invention, the annular array of second hot flaps 10, the hot flaps defining the divergent segment of the nozzle, are located in diametrically opposite pairs, a first pair illustrated at 14a and 14b, while a second pair is illustrated at 15a and 15b located as illustrated in FIG. 3. The first pair 14a and 14b, respectively, are attached to two stationary side supports 16a and 16b located between the array of cold flaps 6 and the array of second hot flaps 10 and is connected to the hot gas exhaust duct 2 by connecting links which are omitted from the drawing. The flaps 14a and 14b are pivotally attached to the stationary side supports 16a and 16b, respectively, by means of shafts 20. A pair of arc-shaped members 17a and 17b each have opposite ends which are pivotally attached to corresponding ends of the side supports 16a and 16b such that the arc-shaped members 17a and 17b are pivotable with respect to the side supports about axes 18a and 18b which both extend substantially perpendicular to the central axis 3. The second pair of hot flaps 15a and 15b are attached to the arc-shaped members 17a and 17b, respectively, by shaft 20.

Accordingly, the stationary side support 16a supports the flap 14a, the stationary side support 16b supports the flap 14b, the arc-shaped member 17a supports the flap 15a and arc-shaped member 17b supports the flap 15b, the flaps being pivotally mounted on the supports and arc-shaped members, respectively, so as to permit the adjustment of the cross-sectional area of throat 13.

When the combination is in its forward thrust mode, each of the second hot flaps 10 is acted on by a biasing means, such as spring 21 inserted between the arc-shaped member 17 or the side support 16 and the flap such that the first, or upstream edges 12 are urged into contact with the downstream edge of the first hot flaps 9. This contact is maintained as the actuators adjust the cross-sectional area of the throat 13 between the positions illustrated in FIGS. 1 and 2.

Figure 5:
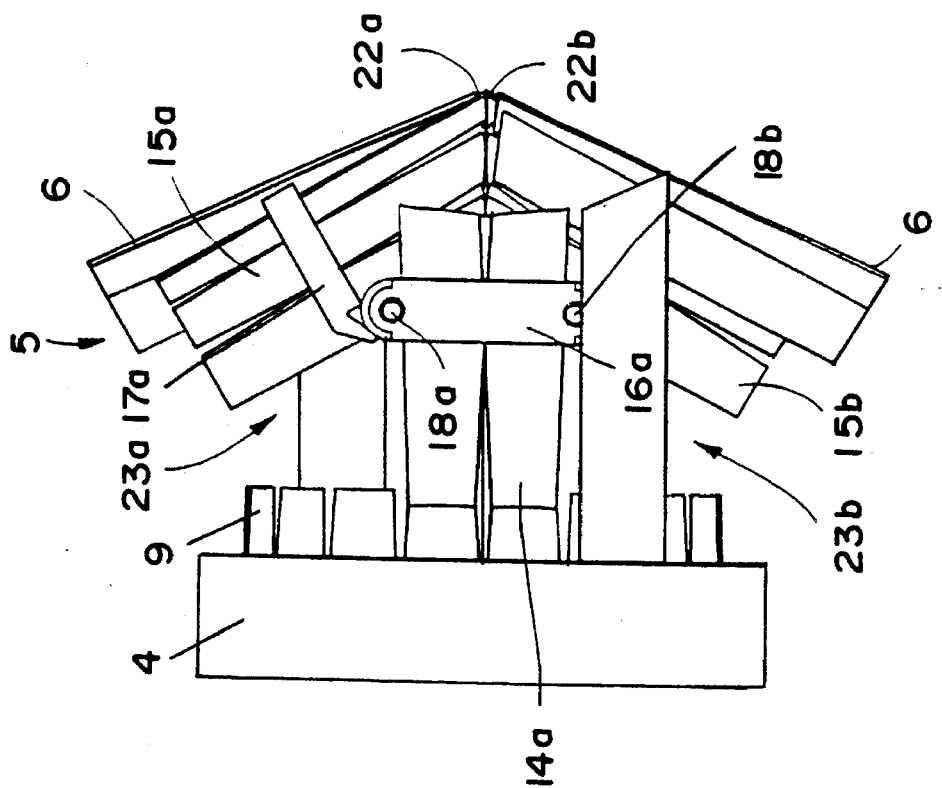
FIG. 5 is a partial, side view of the combination converging-diverging exhaust nozzle and thrust reverser according to the present invention in the reverse thrust position with a portion of the cold flaps being omitted for clarity.

Actuators (not shown) are interposed between a stationary portion of the engine and the arc-shaped members 17a and 17b to cause the arc-shaped members to pivot about their axes 18a and 18b, respectively such that the flaps 15a and 15b are pivoted such that their downstream edges 22a and 22b, respectively, come into mutual contact, as illustrated in FIG. 5. The downstream edges 22a and 22b may be suitably configured to insure that such mutual contact substantially blocks off the hot gases emanating from the hot gas exhaust duct 2. In this reverse thrust position, the exhaust gases are redirected outwardly through openings 23a and 23b to impart a reverse thrust force to the engine structure. As can be seen in FIG. 5, openings 23a and 23b are formed between the upstream edges of the flaps 15a and 15b and the downstream edges of the first hot flaps 9.

Figure 6:
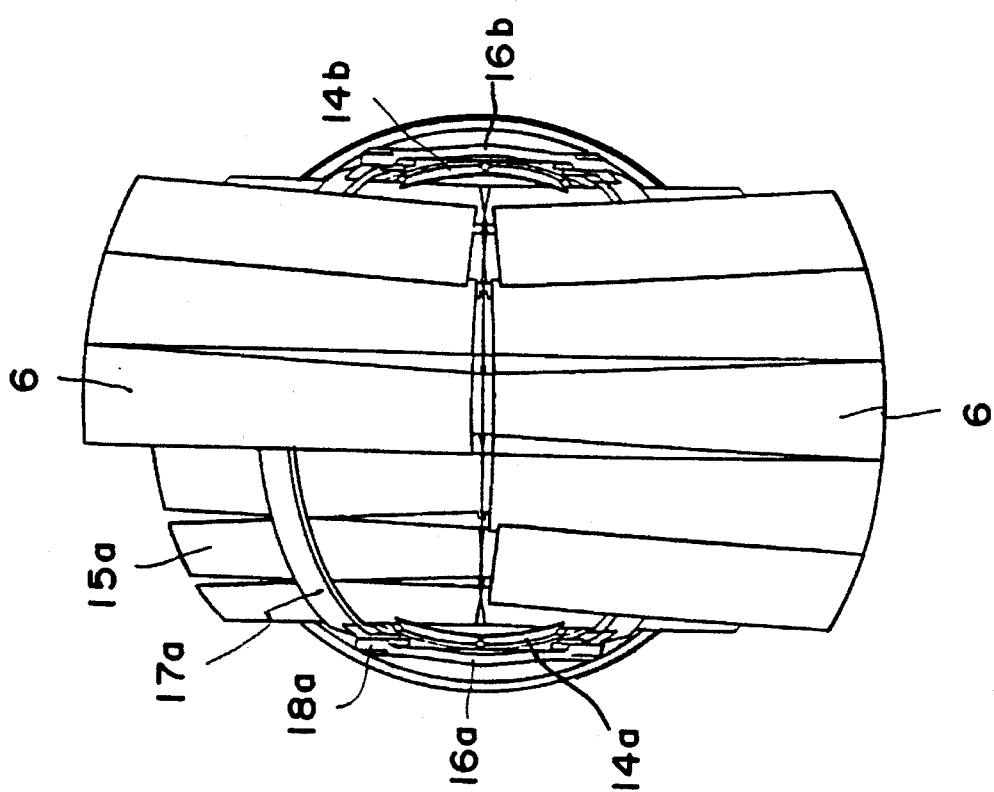
FIG. 6 is a rear view of the exhaust nozzle illustrated in FIG. 5.

In order to prevent the hot exhaust gases from contacting the array of cold flaps 6, it is necessary to move the cold flaps away from the openings 23a and 23b. Such can be accomplished, as illustrated in FIGS. 5 and 6, by attaching at least one of the cold flaps to each of the side supports 16a and 16b and the remaining cold flaps to one of the arc-shaped members 17a and 17b. In this embodiment, the pivoting movement of the arc-shaped members 17a and 17b displaces both the array of second hot flaps 10 and the array of cold flaps 6 to their reverse thrust positions as illustrated in FIGS. 5 and 6.

Figure 7:
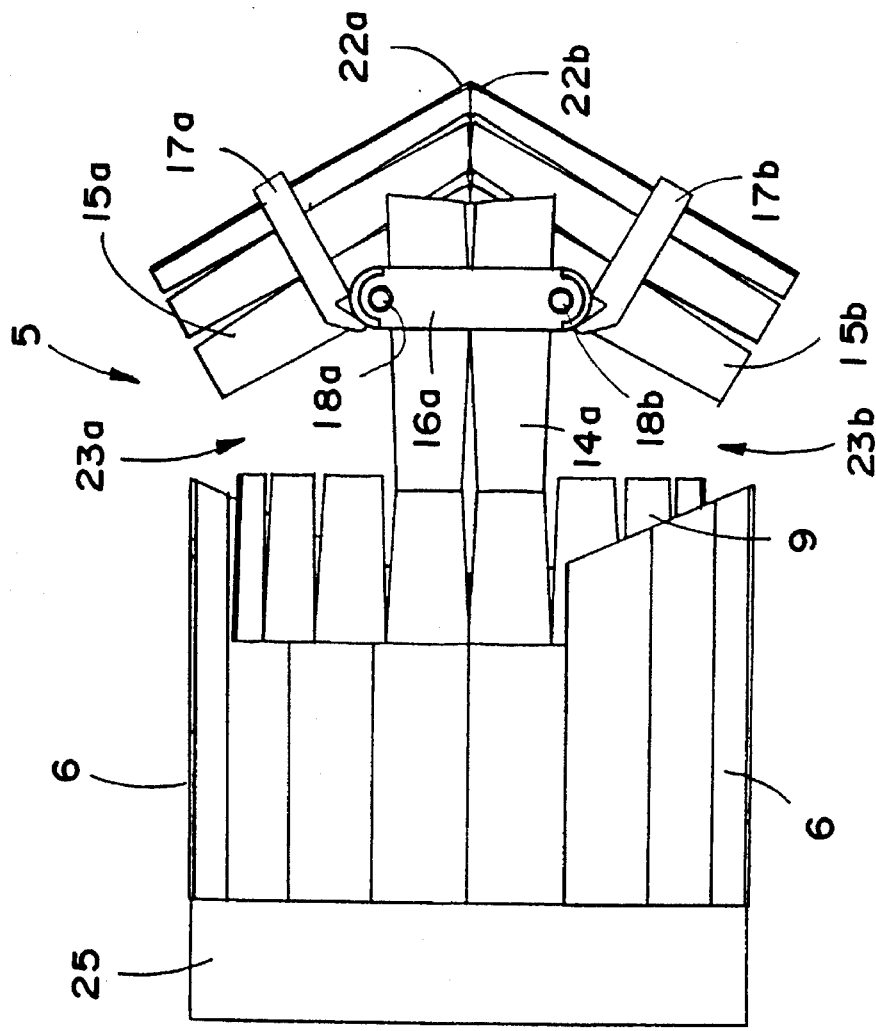
FIG. 7 is a side view of the exhaust nozzle and thrust reverser according to the present invention in the reverse thrust position illustrating a second embodiment of the movement of the array of cold flaps.
Figure 8:
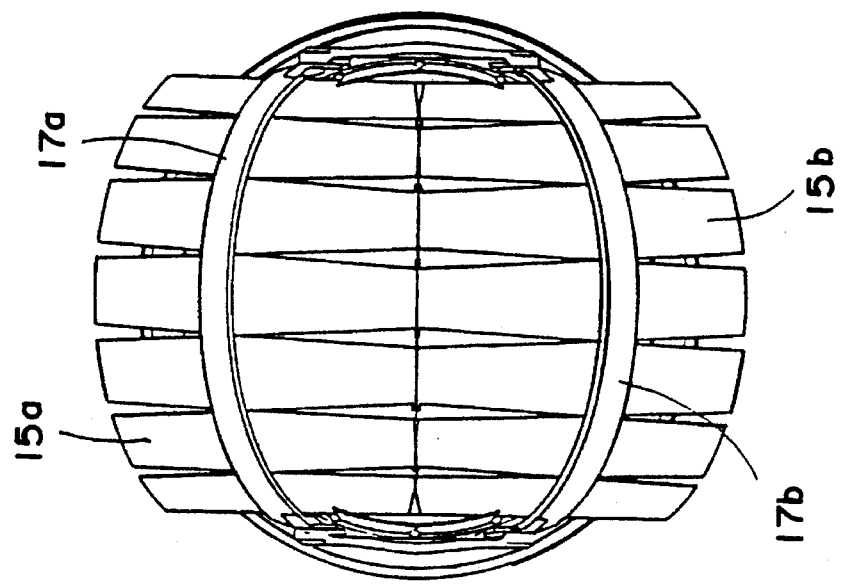
FIG. 8 is a rear view of the nozzle illustrated in FIG. 7.

A second embodiment is illustrated in FIGS. 7 and 8. In this embodiment, the upstream edges of the array of cold flaps 6 are attached to an annular member 25 which is slidably attached to the cowling support structure 4 so as to be movable in a direction parallel to central axis 3. In this particular embodiment, the annular member 25 is moved in an upstream direction from its forward thrust position during reverse thrust operation so as to displace the array of cold flaps 6 upstream of thrust reverser openings 23a and 23b, thereby preventing contact between the array of cold flaps 6 and the hot exhaust gases.

Figure 9:
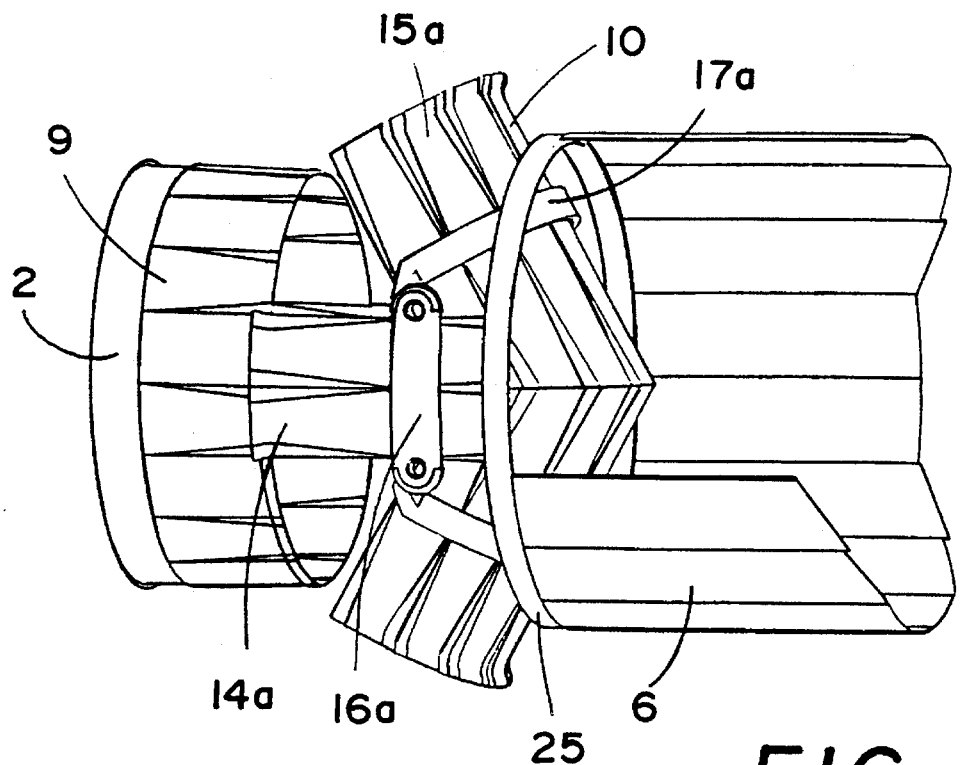
FIG. 9 is a partial, side view of the exhaust nozzle according to the present invention in the reverse thrust position illustrating a third embodiment of the movement of the array of cold flaps.
Figure 10:
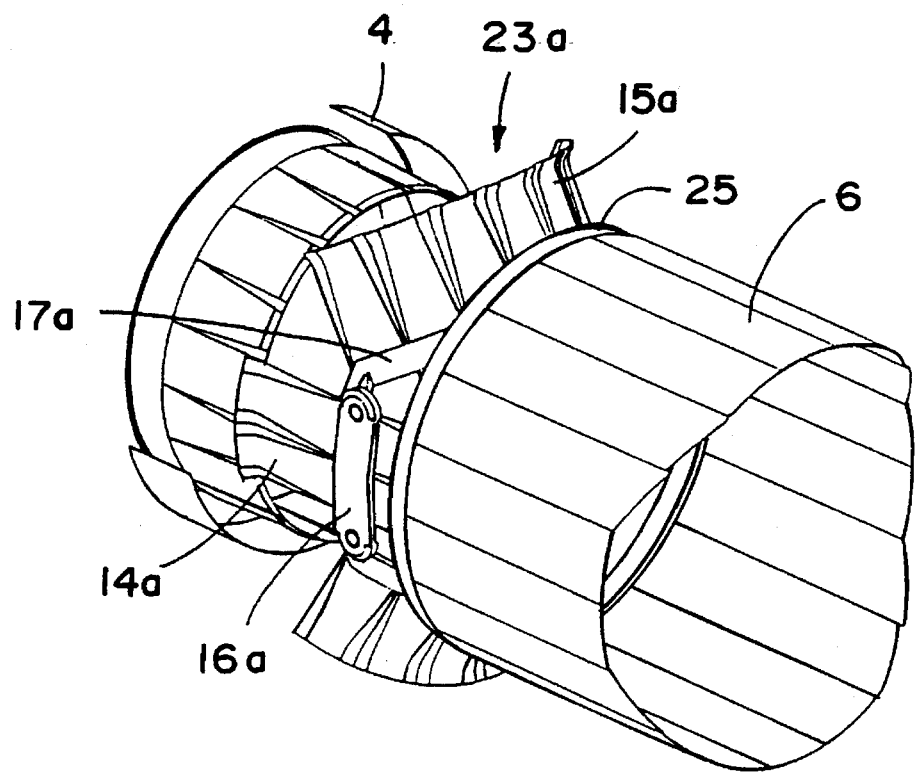
FIG. 10 is a partial, perspective view of the nozzle structure illustrated in FIG. 9.

Alternatively, as illustrated in FIGS. 9 and 10, the annular member 25 may slide in a downstream direction (i.e. in the direction of flow of gases in the forward thrust operation) such that the annular member 25 is displaced downstream of the openings 23a and 23b during reverse thrust operation. Again, this prevents contact between the array of cold flaps 6 and the hot exhaust gases.

When the arc-shaped members 17a and 17b pivot rearward, into their reverse thrust positions, the flaps 14a and 14b remain in their initial positions due to their attachment to the stationary side supports 16a and 16b, thereby establishing a barrier to avoid side leakage of the hot exhaust gases through openings 23a and 23b. Obviously, the configurations of the trailing edges 22a and 22b of the array of second hot flaps 10 must be configured to allow all of the flaps to make mutual contact in the reverse thrust position. The lengths of the flaps 14a and 14b may be somewhat less than the flaps 15a and 15b to insure continuity in the configurations of the trailing edges of the array of second hot flaps 10 and to facilitate the pivoting movement of the flaps 15a and 15b. The flaps of the array of cold flaps 6 may also have downstream edges having the same configurations as the flaps of the array of second hot flaps 10 so as to prevent them from being damaged by the hot gas flow F2.

The present invention employs kinematics which does not constrain the angular attitude of thrust reverser. The exhaust gas flow through the reverse thrust openings 23a and 23b can be directed to the top and bottom of the nozzle structure, or it may be directed laterally, as well as in other diametrically opposite angular positions. Also, the thrust reversing system according to this invention is located entirely inside the engine mainframe, thereby minimizing the effects of aerodynamic forces acting on the movable portions of the thrust reverser and minimizing the chances of inadvertent opening of the system due to the aerodynamic forces.

The foregoing description is provided for illustrative purposes only and should not be construed as in any way limiting this invention, the scope of which is defined solely by the appended claims.

We claim:

1. A combination converging-diverging exhaust nozzle and thrust reverser for an aircraft turbojet engine having a hot gas exhaust duct with a first downstream end and having a central axis, and a cowling support structure generally coaxial with and spaced from the hot gas exhaust duct, the cowling support structure having a second downstream end, the combination comprising:

a) a generally annular array of cold flaps extending from the second downstream end of the cowling support structure, the array of cold flaps movable between a forward thrust position wherein an upstream edge of the array of cold flaps is adjacent to the second downstream end of the cowling support structure and a reverse thrust position wherein the upstream edge of the array of cold flaps is displaced away from the second downstream edge of the cowling support structure;

b) a generally annular array of first hot flaps having a first edge pivotally attached to the first downstream edge of the hot gas exhaust duct and a second edge; and, c) a generally annular array of second hot flaps having a third edge, the array of second hot flaps movable between a forward thrust position wherein the third edge is in contact with the second edge of the array of first hot flaps and a reverse thrust position wherein the third edge is displaced away from the second edge of the array of first hot flaps wherein the array of second hot flaps redirects the hot gases emanating from the hot gas exhaust duct so as to produce a reverse thrust effect.

2. The combination convergent-divergent nozzle and thrust reverser of claim 1 wherein the array of second hot flaps has a plurality of second hot flaps and further comprising stationary supports located on opposite sides of the array of second hot flaps, each stationary support pivotally supporting at least one second hot flap so as to pivot about a first axis extending generally perpendicular to the central axis.

3. The combination convergent-divergent nozzle and thrust reverser of claim 2 wherein the array of cold flaps has a plurality of cold flaps and further comprising arc-shaped members having opposite ends, each end pivotally connected to a stationary support such that the arc-shaped members may pivot with respect to the stationary support about a second axis extending generally perpendicular to the central axis, each arc-shaped member pivotally supporting at least one cold flap.

4. The combination convergent-divergent nozzle and thrust reverser of claim 3 wherein each cold flap has a downstream edge and wherein the array of cold flaps is substantially circular in configuration, the downstream edges of diametrically opposite cold flaps configured so as to contact each other when the array of cold flaps is in the reverse thrust position.

5. The combination convergent-divergent nozzle and thrust reverser of claim 4 wherein each arc-shaped member supports at least one cold flap.

6. The combination convergent-divergent nozzle and thrust reverser of claim 1, further comprising an annular member slidably attached to the cowling support structure so as to move in a direction along the central axis.

7. The combination convergent-divergent nozzle and thrust reverser of claim 6 wherein the annular member slides in an upstream direction to move the annular array of cold flaps from the forward thrust position to the reverse thrust position.

8. The combination convergent-divergent nozzle and thrust reverser of claim 6 wherein the annular member slides in an downstream direction to move the annular array of cold flaps from the forward thrust position to the reverse thrust position.

9. The combination convergent-divergent nozzle and thrust reverser of claim 1 further comprising biasing means acting on the array of second hot flaps to urge the third edge into contact with the second edge of the array of first hot flaps.

10. The combination convergent-divergent nozzle and thrust reverser of claim 9 wherein the biasing means comprises at least one spring.

\* \* \* \* \*